United States Patent [19]

Alexander

[11] Patent Number: 4,836,940

[45] Date of Patent: Jun. 6, 1989

[54] COMPOSITION AND METHOD OF CONTROLLING LOST CIRCULATION FROM WELLBORES

[75] Inventor: William Alexander, Naperville, Ill.

[73] Assignee: American Colloid Company, Arlington Heights, Ill.

[21] Appl. No.: 95,638

[22] Filed: Sep. 14, 1987

[51] Int. Cl.$^4$ ............................ C09K 7/00; C09K 7/02
[52] U.S. Cl. .................................. 252/8.512; 175/72
[58] Field of Search ................. 252/8.512; 175/72; 502/62

[56] References Cited

U.S. PATENT DOCUMENTS

| | | | |
|---|---|---|---|
| 2,642,268 | 6/1953 | Armentrout | 252/8.512 X |
| 2,836,555 | 5/1958 | Armentrout | 252/8.512 |
| 2,856,354 | 10/1958 | Armentrout | 252/8.512 |
| 3,909,454 | 9/1975 | Arzad | 252/8.512 X |
| 4,014,394 | 3/1977 | Bailey | 252/8.512 X |
| 4,217,965 | 8/1980 | Cremeans | 252/8.512 X |
| 4,526,240 | 9/1985 | McKinley et al. | 175/72 |
| 4,551,256 | 11/1985 | Kita et al. | 252/8.512 |
| 4,635,726 | 1/1987 | Walker | 252/8.512 X |
| 4,664,816 | 5/1987 | Walker | 252/8.512 |
| 4,677,174 | 6/1987 | Alexander et al. | 252/194 X |

Primary Examiner—Herbert B. Guynn
Attorney, Agent, or Firm—Mason, Kolehmainen, Rathburn & Wyss

[57] ABSTRACT

A method and composition for controlling the lost circulation of drilling mud in a wellbore during a drilling operation comprising the introduction of a pelletized composition, comprising a water-insoluble, water-absorbent polymer and bentonite, in a weight ratio of water-absorbent polymer to bentonite in the range of from about 9:1 to about 1:9, and preferably in the range of from about 3:1 to about 1:3, into the wellbore to reduce or eliminate drilling mud loss by sealing porous subterranean formations. The pellets essentially maintain their original size as the pellets pass through the wellbore to the site of lost circulation. At the site of lost circulation, the pellets accumulate, absorb water and swell to form an essentially fluid-tight plug. The porous subterranean formation is thereby sealed and further loss of drilling mud is prevented.

6 Claims, No Drawings

COMPOSITION AND METHOD OF CONTROLLING LOST CIRCULATION FROM WELLBORES

FIELD OF THE INVENTION

The present invention relates to a method and composition that unexpectedly reduces the lost circulation of drilling fluids to subterranean cavities and passageways encountered in drilling wells into the earth's crust. More particularly, the present invention relates to a method and composition that reduces or eliminates the lost circulation of drilling fluids during drilling operations by introducing pellets, comprising a water-insoluble, water-absorbent polymer and bentonite, in a weight ratio of water-absorbent polymer to bentonite in a range of from about 9:1 to about 1:9, and preferably in the range of from about 3:1 to about 1:3, into the wellbore, whereby the pellets pass through the borehole in a substantially unswelled state until the pellets reach the zone of lost circulation. At the zone of lost circulation, the pellets accumulate, absorb water and swell to form an essentially fluid-tight plug, thereby sealing the porous formation and preventing further drilling fluid loss.

BACKGROUND OF THE INVENTION

Rotary drilling techniques are used in well drilling to reach and penetrate subterranean oil-containing formations in the earth's crust. In a typical rotary drilling technique, a drill string, having a drill bit connected to its lower end, is rotated, thereby allowing the drill bit to penetrate the earth by cutting and breaking the earth formations it contacts. A drilling fluid normally is circulated down the drill string and through ports provided in the drill bit, and back up to the surface through the annulus formed between the drill string and the wall of the well. The circulating drilling fluid performs numerous functions such as removing the cuttings from the well, cooling the bit, and applying hydrostatic pressure upon the penetrated formations to contain pressurized fluids within the formation.

Common drilling fluids are water- or oil-based liquids containing suspended solids and are normally termed "drilling muds". Whenever possible, usually for reasons of economy, water-based drilling muds are used throughout the drilling operation. The suspended solids in water-based drilling muds are typically clays from the kaolinite, montmorillonite or ilite groups. These clays impart desirable thixotropic properties to the drilling mud and also coat the walls of the well with a relatively impermeable sheath, commonly called a "filter cake", that retards fluid loss from the well into the formations penetrated by the well.

An exemplary montmorillonite clay that can be used in a water-based drilling mud is bentonite. The bentonite is dispersed within the water-based liquid as colloidal particles and imparts various degrees of thixotropy to the drilling mud. The drilling muds often contain other components to further improve the rheological properties of the drilling mud, such as increasing drilling mud density by adding barite (barium sulfate) or galena (lead sulfide).

One difficulty often encountered in rotary drilling operations involves the loss of unacceptably large amounts of the drilling mud into a porous or cracked formation penetrated by the drill. The loss of drilling mud is termed "lost circulation", and the formation is termed a "lost circulation zone" or a "thief formation".

Lost circulation occurs when the well encounters a formation either having unusually high permeability or having naturally occurring fractures, fissures, porous sand formations, cracked or cavernous formations and other types of strata characterized by crevices, channels or similar types of openings conducive to drilling fluid loss. In addition, it is also possible for a formation to be fractured by the hydrostatic pressure of the drilling mud, particularly when a changeover is made to a relatively heavy mud in order to control high internal formation pressures.

When lost circulation occurs, the drilling mud pumped into the well through the drill string enters the cracks in a cracked formation or the interstices of a porous formation and escapes from the wellbore, therefore precluding return of the drilling mud to the surface. In the most severe situation, the lost circulation zone takes the drilling mud as fast as it is pumped into the wellbore, and, in less severe situations, circulation of the drilling mud can be greatly reduced, and eventually result in a shutdown of drilling operations. Normally, the maximum amount of drilling mud loss that is tolerated before changing programs is approximately one barrel per hour. If greater amounts of drilling mud is lost, corrective measures are needed. Drilling generally is not resumed until the thief formation is closed off and circulation of the drilling mud reestablished.

The interruption of normal circulation prevents the entrainment of cuttings and other materials from the borehole, leads to reduced hydrostatic pressure possibly followed by the influx into the wellbore of high pressure formation fluids, can result in the flooding of oil-producing zones with mud or the like, and may eventually cause the drill string to become stuck in the borehole. Even in situations where circulation is not completely lost and some drilling mud can return to the surface, the drilling mud flowing into the lost circulation zone must be replaced continuously. If the drilling mud loss is sufficiently high, the cost of continued drilling or well operation may become prohibitive. Therefore, the lost circulation of drilling mud is a condition that must be prevented or be corrected as quickly as possible.

The best method of controlling lost circulation is to conduct a drilling program such that mud loss will not occur. However, situations exist wherein even correct drilling techniques cannot avoid lost circuation. Therefore, many methods have been used in attempts to plug the cracks or interstices of lost circulation zones to prevent the escape of drilling muds. As a result, a wide variety of materials have been pumped into the well with the drilling mud in an effort to bridge or fill the cracks or interstices of thief formations. It has been found that some materials are successful under certain drilling conditions, yet the same material is unsuccessful under other drilling conditions.

One common method is to increase the viscosity of the drilling mud or to increase the resistance of the drilling mud to flow into the formation. Another technique involves the addition of a bulk material, such as cottonseed hulls, cork, sawdust, perlite, ground walnut shells, hay, wood shavings, granular plastic, vermiculite, rock, mica flakes, leather strips, beans, peas, rice, sponges, feathers, manure, fish scales, corn cobs, glass fiber, ashphalt, ground tires, burlap or other fabrics to the drilling mud. By adding these fibrous, flaky or granular solids to the drilling mud, and pumping the resulting mixture into the borehole, a bridge or mat forms over the cracks or interstices responsible for drilling mud escape.

Although lost circulation zones frequently are plugged by such bulk materials, successful plugging of the thief formation is not assured. Even if large volumes of a solids-containing drilling mud are pumped into the borehole, a bridge or mat may never form over the cracks or interstices of the thief formation. Moreover, the introduction of large quantities of a drilling mud containing a relatively high percentage of bulky solids can produce pressure surges that cause further fracturing and therefore result in additional fissures for even greater drilling mud losses. Bulk materials further proved unsuccessful in sealing off porous formations because they have a tendency to deteriorate under the high drilling pressures, and therefore decrease in volume and become slimy so as to "worm" into the formation openings without forming an effective seal.

Another method utilized to reduce or eliminate lost circulation is to use a cement, such as Plaster of Paris or a silicate, either alone or in combination with the previously discussed bulk materials, volcanic ash, gels and/or other similar materials. However, the cement itself often presents a problem by separating out of the cement slurry that is introduced in the well. The heavier cement particles in the slurry have a tendency to separate from the water and become dehydrated before the porous subterranean formation is sealed. Furthermore, even if the cement is admixed with ingredients designed to prevent premature dehydration, the cement slurry often passes into the porous formation without effectively plugging the openings in the wellbore sidewall. An additional problem encountered with the compositions conventionally used to reduce or eliminate lost circulation is that such compositions must be added gradually, over an extended period of time, therefore shutting down drilling operations for an extended period of time.

In order to overcome the above-mentioned deficiencies associated with the use of solid plugs, it has become a practice to attempt to plug the more porous thief formations and to stop drilling mud loss with a "soft plug", such as a gel. For example, in U.S. Pat. No. 2,800,964, Garrick teaches reducing lost circulation by placing a gel, formed by a liquid-clay dispersion, into the lost circulation zone. Kelly, in U.S. Pat. No. 3,467,208, teaches using an oleophilic bentonite to form a gel and therefore stop lost lost circulation. In U.S. Pat. No. 3,785,437, Clampett et al discloses plugging porous formations by introducing a water-soluble polymer into lost circulation zone and crosslinking the polymer in situ. However, in practical applications of the method of Clampett et al, it was difficult to control gellation characteristics of the water-soluble polymer, and therefore difficult to assure reduction of lost circulation.

A variety of compositions and methods have been proposed to reduce or eliminate lost circulation in wells. Numerous attempts have been made to find a lost circulation composition that is effective in reducing lost circulation, is economical, is easily introduced into the wellbore with minimum drilling disruption, and is stable under the high temperature and pressure conditions encountered in the wellbore. However, the prior art methods and compositions have deficiencies and drawbacks, making the continued search for an effective and efficient method and/or composition for sealing fractures and fissures encountered during drilling operations necessary.

Examples of prior art methods and compositions for controlling lost circulation include Kita et al, in U.S. Pat. No. 4,551,256, disclosing coating inorganic particles, such as bentonite, with a water-absorbing polymer, such that during excavation or drilling, a slurry is formed that swells and is not lost into the ground or cracks in the formations. McKinley et al, in U.S. Pat. No. 4,526,240, teaches that a fibrous mass, comprised of a fibrous absorbent and a water-swellable hydrophilic polymer, injected down a borehole to the lost circulation zone with an inert solvent, like kerosene, will swell and form a seal at the lost circulation zone after contact with water. Both methods have the disadvantages of being expensive and cumbersome in that the Kita method utilizes polymer-coated particles regardless of the presence or absence of thief formations, and the McKinley method utilizes an inert, non-aqueous solvent to introduce the lost circulation composition to the thief formation.

Another method of reducing lost circulation is disclosed by Delhommer et al in U.S. Pat. No. 4,633,950, wherein a hydrocarbon-absorbent polymer is dispersed in an aqueous carrier, then injected to the lost circulation zone. Once the aqueous carrier-polymer mixture is correctly placed at the lost circulation zone, a hydrocarbon is mixed with the aqueous carrier-polymer mixture to swell the hydrocarbon-absorbent polymer and seal the lost circulation zone. Similarly Walker, in U.S. Pat. No. 4,635,726, teaches dispersing a water-absorbent polymer in a hydrocarbon fluid then injecting the mixture into the lost circulation zone. Once the hydrocarbon-polymer mixture is correctly placed in the lost circulation zone, water is mixed with the hydrocarbon-polymer mixture such that the polymer absorbs water and swells to close off the lost circulation zone. Also in U.S. Pat. No. 4,664,816, Walker teaches reducing lost circulation in wellbores by introducing a water-absorbent polymer encapsulated by a protective casing to prevent the polymer from expanding by absorbing water until it reaches the lost circulation zone. Walker teaches that the protective casing can be a film or waxy substance that dissolves or melts at the desired temperature within the borehole, thereby releasing the water-absorbent polymer and allowing it to expand by absorbing water. The resulting water-swelled polymer serves to seal the lost circulation zone and thereby reduce lost circulation.

Other methods of reducing lost circulation are taught in U.S. Pat. No. 4,498,995 disclosing the use of expanded aggregates from clay, clay-shale or slate that are heat and pressure stable; U.S. Pat. No. 4,439,328 disclosing a well servicing fluid comprising an oleoginous liquid, a water-soluble polymer, an alkaline earth metal, a gellant and, optionally, a dispersant; U.S. Pat. No. 4,282,928 disclosing the introduction of discrete spheroidal microgels of a water-swollen or water-swellable crosslinked polymer into the formation; U.S. Pat. No. 4,059,552 disclosing water-swellable polymers for plugging finely porous permeable subterranean strata; U.S. Pat. No. 4,014,394 disclosing bentonite and a magnesium oxide drilling agent as a lost circulation slurry; U.S. Pat. No. 3,909,421 disclosing blending dry, powdered polyacrylamide with bentonite, adding water to the mixture, thus introducing the resulting aqueous mixture down the borehole; U.S. Pat. No. 3,724,565 disclosing an aqueous mixture of a dispersion agent in a water-dispersible oleophilic colloid as a lost circulation compound; U.S. Pat. No. 3,724,564 disclosing lost circulation control by contacting an aqueous and oleoginous liquid to form a gel and plug the thief formation; U.S. Pat. No. 2,836,555 disclosing bentonite encapsulated within a polymeric coating having a hole in the coating, then introducing the encapsulated composition down the borehole, wherein water enters the hole in the polymer coating, swells the bentonite and ruptures the coating, thereby sealing the formation. Other patents relating to lost circulation, and to methods and compositions to reduce or eliminate lost circulation include U.S. Pat. Nos. 4,261,422; 4,128,528; 3,467,208; 3,448,800; 3,198,252; 3,082,823; 3,078,920; 3,053,764; 2,683,690; and British Patent No. 869,333.

Each of the above-discussed processes has sufficient disadvantages making necessary the continued search for an effective, efficient method of reducing or eliminating lost circulation without undue interruption of the drilling process. The present invention provides such a method and composition for reducing and/or eliminating lost circulation to thief formations in wellholes. The method and composition of the present invention provide improved lost circulation control over the compositions and methods disclosed in the prior art, and can be utilized with minimal or no interruption of the drilling operation.

Surprisingly and unexpectedly, it has been found that a mixture of a water-insoluble, water-swellable polymer and bentonite, formed into pellets, can be added to a drilling mud to appreciably improve the control of lost circulation. The pellets can be introduced with the drilling mud directly down the borehole when a lost circulation zone is encountered, thereby reducing or eliminating lost circulation essentially without interrupting the drilling process. In contrast to the prior art, the composition and method of the present invention do not require swell-inhibiting techniques, such as treating the lost circulation composition with an inert, hydrophobic solvent or an oil, before introducing the lost circulation composition into the wellbore and the area of lost circulation. Additionally, the method and composition of the present invention do not require the use of bulky or insoluble fillers, such as coal or sawdust.

In accordance with the method of the present invention, the bentonite-polymer pellets can be introduced directly into the wellbore such that the pellets can pass through the wellbore, while in contact with an aqueous drilling mud, to reach the area of lost circulation in a substantially unswelled state. At the area of lost circulation, the pellets can accumulate, absorb water and swell to form an essentially fluid-tight plug, thereby sealing the porous formation and preventing further drilling mud loss. By employing the method and composition of the present invention, improved drilling performance and lost circulation control efficiency are realized due to superior plugging of the thief formation without major drilling interruptions.

Both bentonite and water-swellable polymers have been used to control lost circulation. However, the combination of bentonite and a water-swellable polymer, in pellet form, provides a method and composition for lost circulation control that is new in the art and provides unexpectedly improved results in controlling lost circulation. These and other advantages of the present invention will be described more fully hereinafter.

SUMMARY OF THE INVENTION

In brief, the present invention is directed to a method and composition that are useful in reducing or eliminating the lost circulation of drilling fluids to porous or cracked subterranean formations. It has been found that pellets, comprising a homogeneous mixture of bentonite and a water-insoluble, water-swellable polymer, unexpectedly and substantially improve the control of lost circulation to thief formations.

Therefore, it is an object of the present invention to provide an improved composition and method for treating wells.

It is also an object of the present invention to provide a method of drilling a well into the earth, whereby the phenomena of lost circulation of a drilling mud to porous or cracked subterranean formations is alleviated or eliminated.

Another object of the present invention is to provide a composition that controls lost circulation of drilling muds to porous or cracked subterranean formations.

Another object of the present invention is to provide a composition for controlling lost circulation that can be added directly to a water-based drilling mud without a hydrophobic, swell-inhibiting pretreatment.

Another object of the present invention is to provide a composition for controlling lost circulation that can be easily introduced into the drilling mud and down the wellbore in a short period of time without disrupting normal drilling operations.

Another object of the present invention is to provide a method and a composition to achieve a relatively rapid plugging of a lost circulation zone with relatively small quantities of material.

Another object of the present invention is to provide a composition that, upon contact with water for a sufficient time, will form an essentially fluid-tight plug for improved lost circulation control in subterranean formations.

Still another object of the present invention is to provide a pelleted composition comprising a homogeneous mixture of a water-insoluble, water-swellable absorbent polymer and bentonite, in a weight ratio of polymer to bentonite in a range of about from 9:1 to about 1:9, and preferably in a range of from about 3:1 to about 1:3, that exhibits substantial improvements in controlling lost circulation of drilling muds to porous or cracked subterranean formations.

The above and other objects and advantages of the present invention will become apparent from the following detailed description of the invention.

DETAILED DESCRIPTION OF THE INVENTION

In accordance with the present invention, a pelleted composition comprising bentonite and a water-insoluble, water-swellable absorbent resin unexpectedly improves the control of lost circulation of drilling muds to porous or cracked subterranean formations. Although the prior art teaches numerous compositions and methods to control lost circulation, the pelletized composition of the present invention demonstrates an improvement in the efficiency and effectiveness of lost circulation control that is both new and unexpected in the art.

During the drilling of a well, the loss of drilling mud to a porous or cracked subterranean formation is immediately evident because recirculation of the drilling mud is reduced or nonexistent. This area of drilling mud loss must be sealed as quickly as possible in order to begin drilling operations again. As previously described, the prior art teaches several methods and compositions for plugging or sealing fissures or porous openings. However, each of the prior art compositions and methods has disadvantages. The prior art methods and compositions either require large volumes of plugging material, take excessively long times to work, and/or require techniques to position the plugging material at the area of lost circulation that disrupt drilling operations. The method and composition of the present invention minimizes or eliminates such disadvantages that are associated with the prior art.

In accordance with the method of the present invention, the pelleted composition is used in conjunction with water-based drilling muds. As will become apparent from the following detailed description of the invention, the composition of the present invention can be added directly to conventional aqueous drilling muds to reduce or eliminate lost circulation. Surprisingly, it has been found that the composition of the present invention can be introduced with the aqueous drilling mud directly into the wellbore without any pretreatment to render the lost circulation composition hydrophobic.

The use of bentonite clay as a component in aqueous drilling muds, and as an agent to control lost circulation, is well-known. Bentonites are economical, readily available clays, with certain forms capable of hydrating and swelling in the presence of water. Although the swelling properties of bentonite impart a fluid loss controlling property to drilling muds, the bentonite must be used in relatively large doses to achieve practical fluid loss properties. Bentonites contain various exchangeable cations, such as sodium, potassium, ammonium, calcium and magnesium. Although any of these ions may be the predominant exchangeable cation of the clay, bentonite clays having calcium or magnesium as the major exchangeable cation do not swell appreciably, and therefore are not capable of imparting fluid loss properties to a drilling mud. As a result, a common type of drilling mud is prepared by dispensing a hydratable clay, such as sodium bentonite, in water, and sometimes adding a weighting agent, such as barite, to bring the mud weight up to the particular desired value. The hydratable sodium bentonite is capable of absorbing water and swelling in volume. In addition, in accordance with the present invention, the hydratable sodium bentonite also can serve as a binding agent to help maintain the water-absorbent polymer and bentonite composition in pellet form.

Although sodium bentonite has been used for controlling lost circulation, bentonite possesses several inherent disadvantages. For example, the most efficient bentonite absorbs only up to a maximum of fourteen times its weight in water. Therefore large doses of bentonite are required to seal the porous or cracked formation. The amount of bentonite required to seal the formation can be sufficiently large such that it becomes economically unfeasible to seal the porous formation, even with an inexpensive commodity such as bentonite. The relatively low absorption and swelling capabilities of the bentonite often results in the bentonite first penetrating into the formation and then swelling, rather than of forming a cake on the borehole wall to seal the porous or cracked formation. Furthermore, if the crack is sufficiently large, the bentonite can travel completely through the fissure and be lost without sealing the area of lost circulation. In addition, the swellable sodium bentonite can be converted to non-swelling calcium bentonite during drilling, either through the intentional addition of calcium ions or through the unintentional contamination by calcium salts encountered during drilling, such as drilling through gypsum or anhydrite. The calcium ion contamination leads to a direct reduction in the control of drilling mud loss.

In order to reduce the amount of bentonite required to seal the formation, and in order to more fully control lost circulation of the drilling mud, it has been found that water-insoluble, water-swellable absorbent polymers can be admixed with swellable forms of bentonite to produce a composition suitable for reducing or eliminating the phenomena of lost circulation. The water-swellable absorbent polymers used in the present invention are capable of absorbing several hundred times their weight in water, and swelling to a substantial degree, to effectively seal thief formations.

The water-insoluble, water-swellable absorbent polymers useful in the method and composition of the present invention are not particularly limited in structure, except that the absorbent polymer must exhibit minimal solubilization and substantial swelling upon absorption of several hundred times its weight of water. Such absorbent polymers include substituted and unsubstituted, synthetic and natural polymers The water-absorbing resins usually are moderately crosslinked and contain hydrophilic moieties such as carboxyl, sulfonate, sulfate, hydroxy, phosphate and/or amino groups and the like. The water-absorbent polymers useful in the method and composition of the present invention include substituted or unsubstituted polymers, copolymers or terpolymers of hydrolysis products of starch-acrylonitrile graft polymers; crosslinked carboxymethylcellulose; crosslinked polyacrylamides; and polymethacrylamides; crosslinked polyacrylates; polyvinyl alcohols; polyacrylonitriles; polyvinylpyrrolidones; sulfonated polystyrene; hydrolyzed polyacrylamides; polyethylene oxide; sulfated hydroxyethyl polyacrylates; sulfated polyvinyl alcohol; sulfated hydroxypropyl methacrylate; polymers derived from methacryloxy ethyl phosphate; polymerized alpha, beta-unsaturated carboxylic acids and their salts; polymerized aromatic or heterocyclic sulfonic acids, such as 2-vinyl-3-bromobenzenesulfonic acid and 2-sulfo-5-allylfurane; polymerized aliphatic sulfonic acids, such as ethylene sulfonic acid; alginates; carrageenen; proteins, such as gelatin, and casein; crosslinked gum arabic; agar; gum ghatti; crosslinked polysaccharide; acrylic or methacrylic acid graft copolymers; starch-acrylic acid graft copolymers; hydrolyzed starch-methyl methacrylate graft copolymers; crosslinked polysaccharide-acrylamide copolymer hydrolyzates, such as crosslinked products of hydrolyzed starch-ethyl acrylate graft copolymer, hydrolyzed starch-methyl methacrylate graft copolymer, hydrolyzed starch-acrylonitrile graft copolymer and hydrolyzed starch-acrylamide graft copolymer; crosslinked alkyl acrylate or methacrylate-vinyl acetate copolymer hydrolyzates, such as crosslinked products of hydrolyzed ethyl methacrylate-vinyl acetate copolymer and hydrolyzed methyl acrylate-vinyl acetate copolymer; crosslinked starch-acrylonitrile-acrylamide-2-methylpropanesulfonic acid graft copolymer hydrolyzates; crosslinked starch-acrylonitrile-vinyl-sulfonic acid graft copolymer hydrolyzates; polyfumaride; polyvinylbenzyltrimethylammonium chloride; crosslinked polymers of alpha, beta-unsaturated acids containing a plurality of carboxyl groups, such as fumaric acid and itaconic acid; and the like.

The absorbent polymers useful in the present invention also include nonhydrophilic monomers, such as styrene, copolymerized with the hydrophilic monomers, as long as the water-absorption characteristics and swellability of the resulting resin is sufficiently large to allow the resin to function as a fluid loss control agent. The polymers useful in the present invention can be used alone or admixture, and can be surface treated by various agents, such as polyquaternary amines, to improve the water-absorption, water-retention and water-swellability properties of the polymer.

To achieve the full advantage of the present invention, crosslinked homopolymers of acrylic acid or methacrylic acid, or their salts; crosslinked homopolymers of acrylic acid or methacrylic acid or their salts, synthesized in the presence of a styrene-maleic anhydride resin; or crosslinked polymers derived from acrylic acid or methacrylic acid copolymerized with styrene, wherein the polymers can be synthesized from a monomer solution either including a styrene-maleic anhydride resin or lacking a styrene-maleic anhydride resin, can be admixed with a water-swellable bentonite to provide an efficient drilling fluid loss control agent.

To further improve the fluid loss capabilities of the bentonite and water-absorbent polymer mixture, the water-absorbent polymer is surface treated with a polyquaternary amine before mixing the water-absorbent polymer with the bentonite. The improved water-absorption and water-retention characteristics realized by copolymerizing acrylic acid with styrene is fully disclosed in U.S. Pat. No. 4,677,174 and hereby incorporated by reference. Similarly, the improved water-absorption and water-retention characteristics achieved by polymerizing acrylic acid or methacrylic acid, and optionally, styrene in the presence of a styrene-maleic anhydride resin is disclosed in U.S. patent application Ser. No. 067,233, dated June 25, 1987, and is incorporated herein by reference. The benefits achieved by surface treating the polymers with a polyquaternary amine are disclosed in U.S. patent application Ser. No. 872,654, dated June 10, 1986, also hereby incorporated by reference.

The use of water-insoluble, water-swellable absorbent polymers in drilling mud loss control agents has the disadvantage of immediate water absorption and swelling upon contact with water. To preclude immediate water absorption by the water-absorbent polymer, prior art methods found it necessary to treat the water-absorbent polymer to make it temporarily hydrophobic, or to first form a slurry in a nonaqueous, oleaginous liquid in order to position the water absorbent polymer at the point of lost circulation, then to allow contact between the water-absorbent polymer and water such that the polymer swells and seals the thief formation. The prior art methods usually required the addition of large, bulky fillers to assist in sealing the thief formation. The prior art methods also led to major disruptions in the normal drilling process by necessitating stoppage of the drilling in order to introduce a non-aqueous liquid and/or bulky fillers into the borehole, adding the fluid loss control agent, then contacting the fluid loss control agent with water in an attempt to plug the thief formation.

However, in accordance with an important feature of the present invention, it has been found that pellets, formed from a homogeneous mixture of a water-insoluble, water-swellable absorbent polymer and a hydratable bentonite, unexpectedly eliminates or reduces fluid loss from thief formations essentially without major drilling disruptions. Surprisingly, it has been demonstrated that pellets comprising hydratable bentonite and a water-insoluble, water-absorbent polymer, in a weight ratio ranging from about 1:9 to about 9:1 of bentonite to water-absorbent polymer, and preferably in a ratio of about 1:3 to about 3:1 of bentonite to water-absorbent polymer, can be added directly to an aqueous drilling mud, without disrupting the drilling operation, to reduce or eliminate drilling fluid loss to porous formations. Unlike similar, powdered or granular mixtures comprising bentonite and a water-absorbent polymer, that immediately absorb water and swell upon addition to an aqueous drilling mud, the pellets of the present invention essentially maintain their original size as they pass through the borehole to the point of lost circulation. At the point of lost circulation, pellets accumulate, then swell upon further water absorption to seal the thief formation. In addition, it also has been demonstrated that the pellets will not be displaced or forced into the porous formation by the pressures encountered in the borehole.

The method and composition of the present invention demonstrate a surprising reduction in drilling mud loss to porous formations, without interrupting drilling operations, by introducing a homogeneous water-absorbent polymer and bentonite mixture, as a pellet into the borehole. The pellet form sufficiently delays hydration of the bentonite and water-absorbent polymer to allow more efficient placement of the lost circulation composition at the area of lost circulation. The water-absorbent polymer exposed on the surface of the pellet absorbs water and swells upon initial water contact, thereby sealing the remainder, or the internal portion, of the pelleted composition from immediate water contact. By sealing the internal portion of the pellet composition from immediate water contact, sufficient time, such as from about $\frac{1}{4}$ hr. to about $\frac{1}{2}$ hr., is provided for the pellet to reach the area of lost circulation. At this point, the pellets accumulate, absorb water over time, swell to several hundred times their original volume, and therefore seal the porous formation. In situations having a particular area of lost circulation that is sufficiently deep or sufficiently large such that more than about $\frac{1}{2}$ hr. is required for the drilling mud carrying the pelleted composition of the present invention to place a sufficient amount of the pelleted composition at the area of lost circulation, the swelling times of the pellets can be appreciably lengthened by adding approximately one-pound per barrel of a polyanionic cellulose into the mixture of the drilling mud and pelleted composition. To insure that the pelleted composition of the present invention does not swell prematurely, and therefore reduce the ability of the pellets to seal to the area of lost circulation, it is preferred that the pelleted composition is added to the drilling mud at the job site.

In accordance with an important feature of the present invention, the pellets of the present invention reduce lost circulation by accumulating within the openings before swelling, and not by forming a cake on the borehole wall. Normally, addition of the pellets to the drilling mud, placement of the pellets at the area of lost circulation, and swelling of the pellets to seal the areas of lost circulation requires from about 1 hr. to about 3 hrs. However, it is to be understood that the actual time required to seal the area of lost circulation depends upon the amount of pelleted composition that is used, the size of the lost circulation zone, and the porosity of the subterranean formation. Furthermore, it has been found that the pellets of the present invention are most effective in fresh water-based drilling muds, and are minimally or non-effective in salt water-based drilling muds. Surprisingly, however, the pellets of the present invention can be added to any fresh water-based drilling mud, even those intentionally or inadvertently contaminated by calcium ions, without adversely affecting the swelling ability of the pellets.

Other common drilling mud additives can be incorporated into the lost circulation pellets of the present invention, as long as the basic properties of the lost circulation pellets are not adversely affected. The additives include weighting agents, such as crushed oyster shells, barite and the like; water-loss agents like ground walnut shells and cottonseed hulls; pH adjusters like magnesium oxide and sodium carbonate; dispersants and stabilizers such as polyacrylates, lignins, lignosulfonates, tannins and polyphosphates; as well as other conventional additives as required by the particular well and particular geologic formation being drilled. Although the lost circulation pellets of the present invention are intended for use in water-based drilling muds, it is to be understood that at certain times, small mount of other liquids may be emulsified or admixed with the water-based fluid. For example, drilling fluids may at times contain small amount of oil, emulsified or admixed with the drilling fluid, the oil coming either from a penetrated oil-bearing formation or from purposeful additions.

To achieve the new and unexpected results of the present invention, pellets, comprising a uniform mixture of hydratable bentonite and a water-absorbent polymer, are manufactured according to methods that are well-known in the art to produce pellets ranging in size from about ¼ in. by about ¼ in. to about ½ in. by about ½ in. The pellets can consist essentially of hydratable bentonite and the water-absorbent polymer, however, the other common drilling mud additives described above and/or relatively low percentages of suitable binding agents, such as water or stearic acid, can be incorporated into the pellets to improve the physical characteristics of the pellets or to assist in the manufacture, storage and use of the pellets.

The specific amount of lost circulation pellets to be added to the aqueous drilling mud to stop lost circulation will depend upon the particular drilling conditions and geologic formation at hand. It generally can be stated that an amount of pellets sufficient to eliminate the loss of drilling fluid to a porous formation having holes of about ¼ in. in diameter or less, can be added to the aqueous drilling mud to stop lost circulation without adversely affecting the drilling mud.

More particularly, the amount of pellets required to reduce lost circulation can range from about 10 lbs. to about 150 lbs. per barrel of drilling mud. However, generally, usually from about 25 lbs. to about 100 lbs. of pellets per barrel of drilling mud is sufficient to reduce or eliminate the lost circulation of drilling muds. Furthermore, to achieve the full advantage of the present invention, it is preferred to incorporate as much of the pelleted material into the drilling mud as is possible, such as up to approximately 100 pounds per barrel of drilling mud.

In accordance with the method of the present invention, the pellets can be added continuously or as a slug dose depending upon the particular drilling conditions. However, slug dosages are preferred. For example, to introduce the pellets at the site of lost circulation, an amount of drilling mud, containing the pelleted composition, that is equal to to three times the expected volume of the lost circulation zone hole is positioned in the drill pipe adjacent to the lost circulation zone. After positioning this volume of the drilling mud containing the pelleted composition, a second volume of drilling mud, not containing any pellets and about one-half the volume of the drilling mud containing the pellets, then is introduced into the drill pipe to help position the pellets into the lost circulation zone and to free the drill pipe of any pelleted material. If lost circulation is not restored within a few hours, the procedure can be repeated.

Surprisingly and unexpectedly, for subterranean formations having openings of approximately ¼ in. in diameter or less, the use of cements and squeezing agents can be avoided by utilizing the pellets of the present invention. However, for openings that are appreciably larger than ¼ in. in diameter, it may become necessary to use a cement or a squeezing agent in conjunction with the pellets of the present invention to assure efficient sealing of the lost circulation zone. In addition, coarse and bulky loss control materials, such as walnut hulls or mica, can be added to the drilling mud, prior to adding the pelleted composition, to assist in sealing subterranean formations having openings ¼ in. or greater in diameter.

In accordance with another important feature of the present invention, after positioning the pellets in the zone of lost circulation and allowing the pellets sufficient time to swell and seal the zone of lost circulation, the swelled pelleted composition is not displaced or forced into the zone of lost circulation by the subsequent pressures encountered in the borehole. For example, the ability of the swelled pelleted composition to withstand borehole pressures was tested using a disc, having ¼ in. diameter holes, that supported a 2 in. bed of marbles. Varying amounts of up to the equivalent of 100 pounds per barrel of drilling mud of a pelleted composition, including 50% by weight of sodium bentonite and 50% crosslinked potassium polyacrylate, were added to a bentonite-based drilling mud having a viscosity of 15 centipoise. The pellet-drilling mud mixture was poured into the tester, and the mixture was allowed to set in the tester for from about 5 min. to about 30 mins. After setting, a standing pressure was applied slowly until the seal formed by the swelled pellets was broken and a 15 centipoise viscosity, bentonite-based drilling mud flowed through the marble bed. It was found that at low dosages of pellets, such as an equivalent of about 25 pounds per barrel of drilling mud, setting for a short time, such as 5 minutes, that the swelled bentonite-polymer seal withstands pressures of 200 psi. Furthermore, surprisingly, and in accordance with an important feature of the present invention, by utilizing higher dosages of the pelleted material and longer set times, such as about the equivalent of 100 pounds of pellets per barrel of drilling mud and about 30 minutes set time, the swelled bentonite-polymer seal withstands pressures of 1000 psi.

In accordance with the method and composition of the present invention, to demonstrate the new and unexpected results arising from using the homogeneous bentonite and water-absorbent polymer pellets, 100 lbs. of pellets, comprising approximately 50% by weight hydratable sodium bentonite homogeneously mixed with approximately 50% by weight of a water-absorbing, water-swelling polymer comprising potassium polyacrylate, was introduced slugwise into a borehole in Dallas, Tex. upon encountering a thief formation. The pellets, approximately ¼ in. by ¼ in. in diameter, were introduced directly into the drilling mud without disrupting the drilling operation. Within 3 hrs., the lost circulation decreased from approximately 100 barrels per hour to approximately 0 barrel per hour. The unexpected 100% decrease in lost circulation was achieved without having to interrupt the normal drilling operation. The swelled, pelleted material that remained in the circulating drilling mud increased the viscosity of the drilling mud, but not to such an extent that the drilling operation was adversely affected. No other mud properties were affected.

It should be understood that the present disclosure has been made only by way of preferred embodiment and that numerous changes in details of construction, combination, and arrangement of parts may be resorted to without departing from the spirit and scope of the invention as hereunder claimed.

What is claimed and sought to be secured by Letters Patent of the United States is:

1. A composition for preventing and/or counteracting the lost circulation of a drilling mud comprising pellets of a homogeneous mixture of a water-swellable bentonite and a water-insoluble, water-absorbent cross-linked polyacrylate, wherein the weight ratio of the bentonite to the water-absorbent polymer ranges from about 1:3 to about 3:1.

2. The composition of claim 1, wherein the water-swellable bentonite is sodium bentonite.

3. The composition of claim 1, wherein the pellets range is size from about ¼ in. by about ¼ in. to about ½ in. by about ½ in.

4. A method of treating wellbores to prevent and/or restore the lost circulation of a drilling mud comprising:
   introducing into the drilling mud a composition comprising pellets formed from a homogeneous mixture of a water-swellable bentonite and a water-insoluble water-absorbent cross-linked polyacrylate polymer, wherein the weight ratio of the bentonite to the water-absorbent polymer ranges from about 1:3 to about 3:1;
   circulating the drilling mud and the pellets, in essentially unswollen form, down the wellbore to the area of lost circulation; where the pellets in essentially unswollen form accumulate, absorb water, and swell to seal the area of lost circulation.

5. The method of claim 4, wherein the water-swellable bentonite is sodium bentonite.

6. The method of claim 4, wherein the pellets comprising a homogeneous mixture of the water-swellable bentonite and the water-absorbent polymer range in size from about ¼ in. by about ¼ in. to about ½ in. by about ½ in.

* * * * *